(12) United States Patent  
Gilbertson et al.

(10) Patent No.: US 8,087,688 B2
(45) Date of Patent: *Jan. 3, 2012

(54) COLLAPSIBLE PUSHCHAIR

(75) Inventors: Michael Quinton Gilbertson, London (GB); Steven James Moore, London (GB)

(73) Assignee: 100 Watt Limited, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,314

(22) Filed: Aug. 12, 2010

(65) Prior Publication Data

US 2010/0301587 A1 Dec. 2, 2010

Related U.S. Application Data

(63) Continuation of application No. 11/581,921, filed on Oct. 17, 2006, now Pat. No. 7,871,099.

(30) Foreign Application Priority Data

Oct. 19, 2005 (GB) .................................. 0521298.0

(51) Int. Cl.
    *B62B 7/06* (2006.01)
(52) U.S. Cl. ......................... 280/642; 280/643; 280/647
(58) Field of Classification Search .................. 280/642, 280/42, 647, 47.38, 639, 650, 652, 648, 47.34, 280/30, 658, 43.16
    See application file for complete search history.

(56) References Cited

U.S. PATENT DOCUMENTS

| | | | | |
|---|---|---|---|---|
| 2,564,266 A * | 8/1951 | Linton | | 280/37 |
| 3,679,223 A * | 7/1972 | Sakal | | 280/37 |
| 3,836,164 A * | 9/1974 | Sugino et al. | | 280/642 |
| 3,936,069 A * | 2/1976 | Giordani | | 280/650 |
| 4,216,974 A * | 8/1980 | Kassai | | 280/650 |
| 4,763,911 A * | 8/1988 | Gebhard et al. | | 280/37 |
| 4,786,064 A * | 11/1988 | Baghdasarian | | 280/30 |
| 4,834,403 A * | 5/1989 | Yanus et al. | | 280/30 |
| 5,863,061 A * | 1/1999 | Ziegler et al. | | 280/642 |
| 5,899,467 A * | 5/1999 | Henkel | | 280/47.25 |
| 5,988,657 A * | 11/1999 | Henkel | | 280/47.25 |
| 6,016,893 A * | 1/2000 | Chen et al. | | 280/37 |
| 6,105,997 A * | 8/2000 | Watkins | | 280/649 |
| 6,238,125 B1 * | 5/2001 | Lin | | 403/102 |
| 6,478,104 B1 * | 11/2002 | Kemper | | 280/642 |
| 6,513,827 B1 * | 2/2003 | Barenbrug | | 280/648 |
| 6,783,135 B1 * | 8/2004 | Nord | | 280/30 |
| 6,942,238 B1 * | 9/2005 | DeCarlo | | 280/651 |
| 6,991,248 B2 * | 1/2006 | Valdez et al. | | 280/647 |
| 7,798,500 B2 * | 9/2010 | Den Boer | | 280/47.34 |
| 7,871,099 B2 * | 1/2011 | Gilbertson et al. | | 280/642 |
| 2006/0061066 A1 * | 3/2006 | Tan | | 280/642 |

* cited by examiner

*Primary Examiner* — Hau Phan
(74) *Attorney, Agent, or Firm* — GableGotwals

(57) ABSTRACT

A collapsible pushchair can be expanded into a deployed state for carrying a child and collapsed into a portable state for being carried as a piece of luggage. Transformation of the pushchair between its deployed and portable states is enabled by the use of rotationally mounted chair legs.

19 Claims, 20 Drawing Sheets

COLLAPSIBLE PUSHCHAIR

CROSS-REFERENCE TO RELATED APPLICATIONS

This is a continuation application of U.S. application Ser. No. 11/581,921 filed Oct. 17, 2006 which claims priority to Great Britain Patent Application No. GB0521298.0, filed Oct. 19, 2005.

FIELD OF THE INVENTION

The present invention relates to a pushchair which can be expanded into a deployed state to carry a child, and can be collapsed into a portable state for carrying. In particular, it relates to a pushchair which can be collapsed into the form of a piece of luggage.

BACKGROUND OF THE INVENTION

A pushchair for a child which can be converted into the form of a suitcase is known in the art. For example, US2004/0026882 discloses a convertible luggage device, which can be converted into a pushchair. This has the disadvantage that the seat for a child in the pushchair state is of inappropriate dimensions for a small child.

GB 2,285,776 discloses a chair for a child which can be converted into a form of a suitcase. The dimensions of the seat do not match those required for a child to sit comfortably on the seat.

SUMMARY OF THE INVENTION

The present invention provides a collapsible chair according to claim 1. Thus, the chair provides a seat which is suitable for carrying a small child. The pushchair can be collapsed to have relatively small outer dimensions, allowing easy transport and storage.

BRIEF DESCRIPTION OF THE DRAWINGS

A preferred embodiment of the present invention will now be described, by way of example only, with reference to the accompanying figures, in which:

FIGS. 7b and 7c are side views of the first reclining embodiment of the pushchair of FIG. 7a;

FIGS. 8b, 8c and 8d are side views of the second reclining embodiment of the pushchair of FIG. 8a;

BRIEF DESCRIPTION OF THE PREFERRED EMBODIMENT(S)

Figure 1:
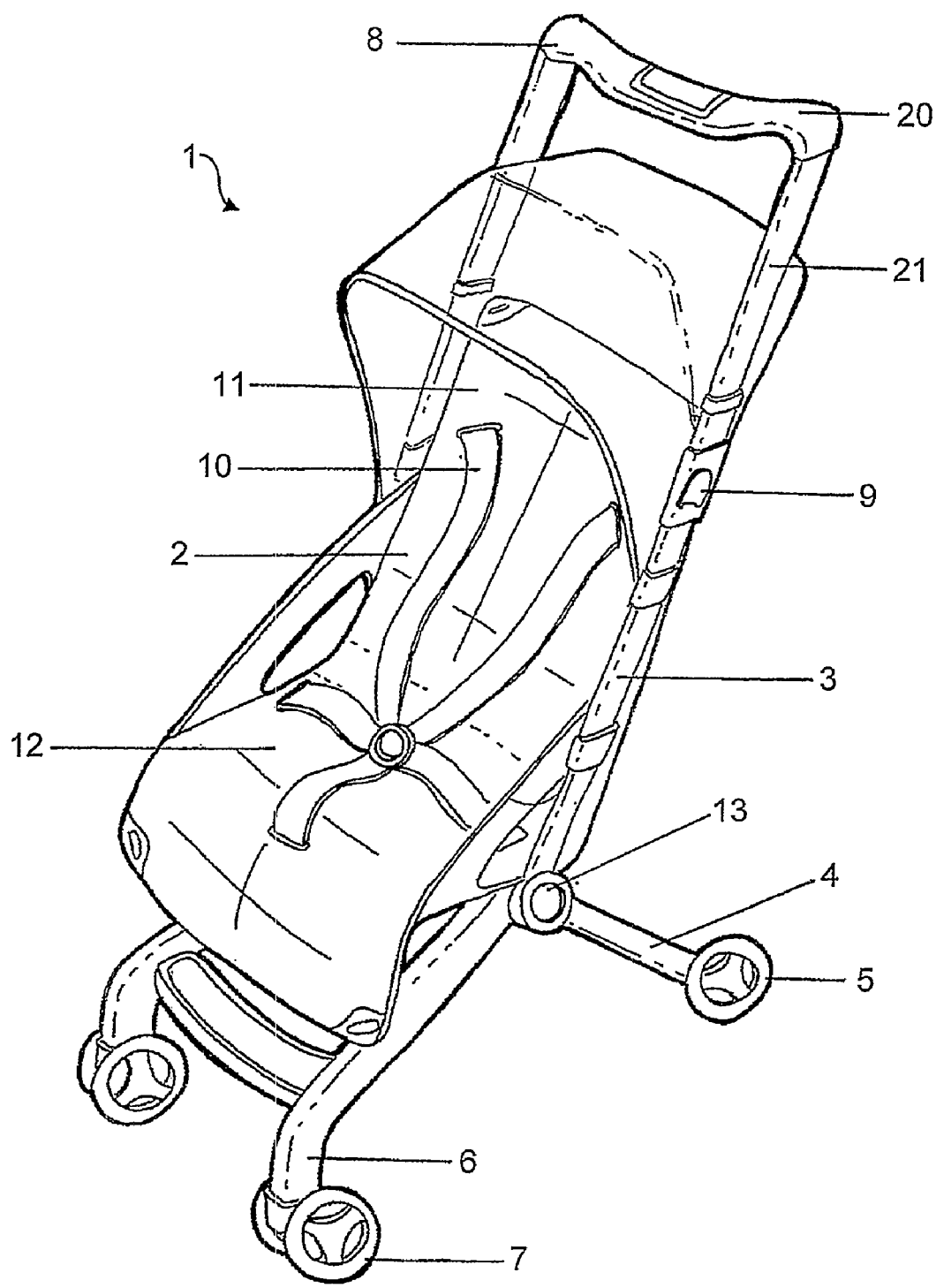
FIG. 1 is a perspective view of the pushchair of the present invention.

With reference to FIG. 1, a pushchair 1 of the present invention is shown in its first state, deployed to carry a child. The pushchair 1 comprises a seat 2 for carrying an infant or small child. The seat 2 is formed of a seat back 11 and a seat base 12. The seat back 11 is supported by a seat frame 3. The seat frame 3 comprises two elongate members extending on each side of the seat back 11, and secured to the seat back 11.

The pushchair 1 comprises two rear legs 4, the rear legs 4 each having at least one rear wheel 5 rotatably attached to the distal end of each leg 4. The pushchair comprises two front legs 6, the front legs each having at least one front wheel 7 rotatably attached to the distal end of the leg. The rear legs 4 extend rearwardly and downwardly from the seat. A pivot mechanism 13 joins the seat 2, the front legs 6 and the rear legs 4. The seat 2 is connected to the pivot mechanism 13 by the seat frame 3, the seat frame 3 rigidly connected to the pivot mechanism 13. The front legs 6 and rear legs 4 are rotatably connected to the pivot mechanism 13, so that the front legs 6 and rear legs 4 can rotate relative to the seat 2 and seat frame 3.

A handle 8 is connected to the seat frame 3. The handle 8 is substantially n-shaped, having a horizontal pushing bar 20 connected to two downwardly extending arms 21. The arms 21 are slideable telescopically within the seat frame 3, such that the position of the pushing bar 20 can be varied. A locking means 9 can lock the handle 8 in the required position relative to the seat frame 3.

The pushchair 1 functions as a conventional pushchair, in which an infant is transported in a seated position in the seat 2. A seatbelt 10 ensures that the infant remains safely seated in the seat 2.

The pushchair 1 is collapsible so as to have smaller exterior dimensions. This allows the pushchair 1 in its collapsed state to be easily transported and stored. In particular, the pushchair 1 in its collapsed state is of a weight and dimensions necessary to meet the requirements of commercial airlines to be carried on board an aeroplane as hand luggage. The pushchair is of particular use when travelling, especially by aeroplane.

Figure 2A:
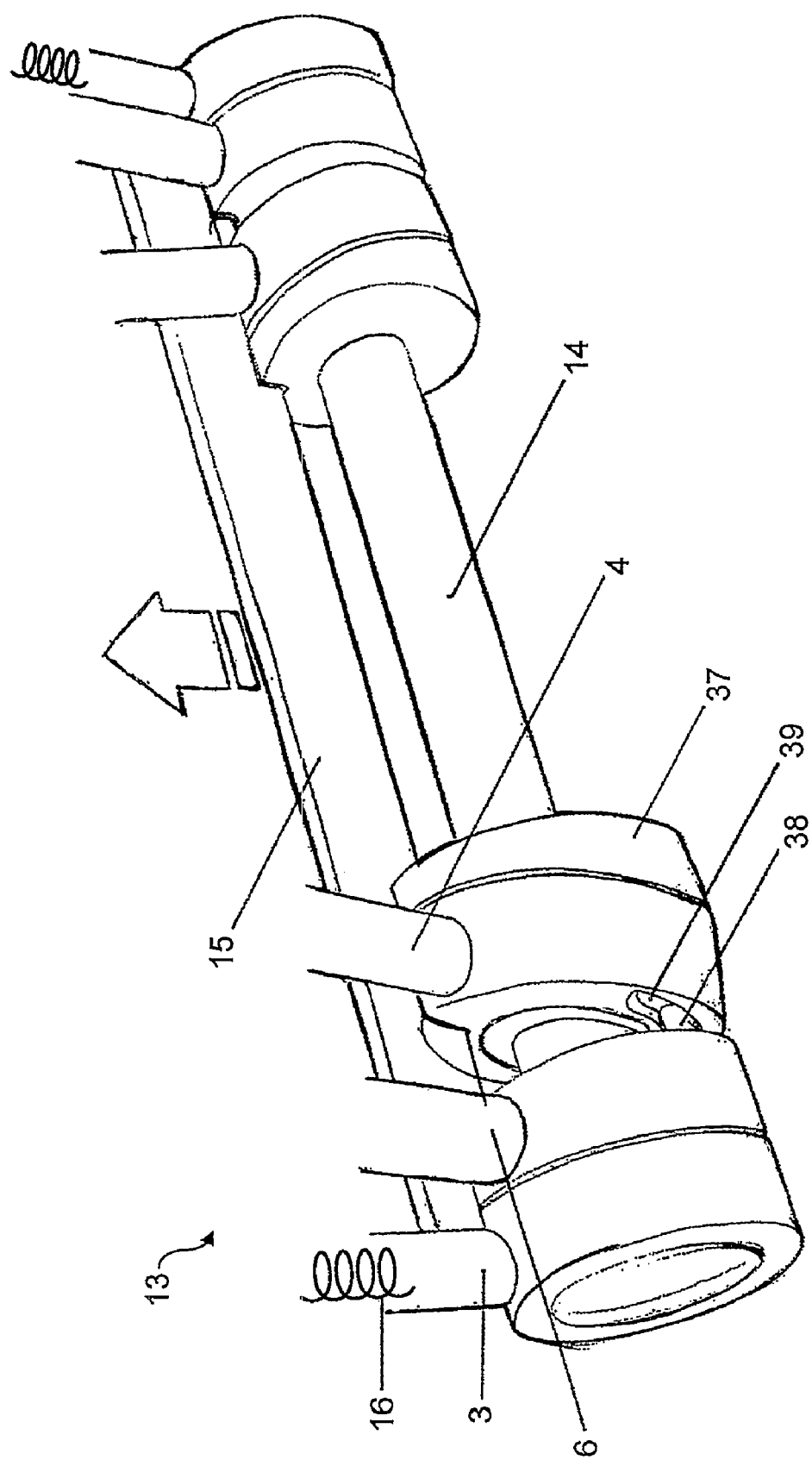
FIG. 2a is perspective view of the hinge mechanism of the pushchair of the present invention.
Figure 2B:
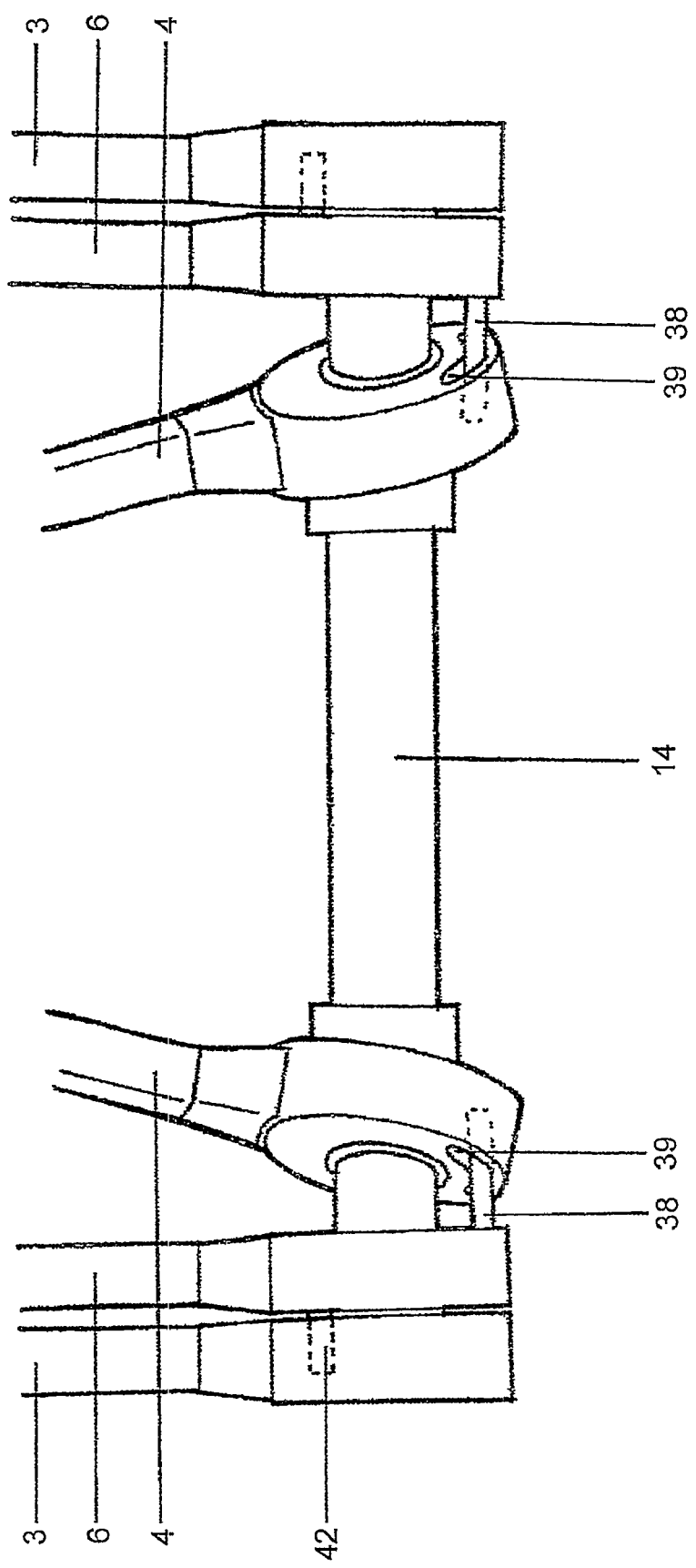
FIG. 2b is a front view of the hinge mechanism of the pushchair of the present invention.
Figure 2C:
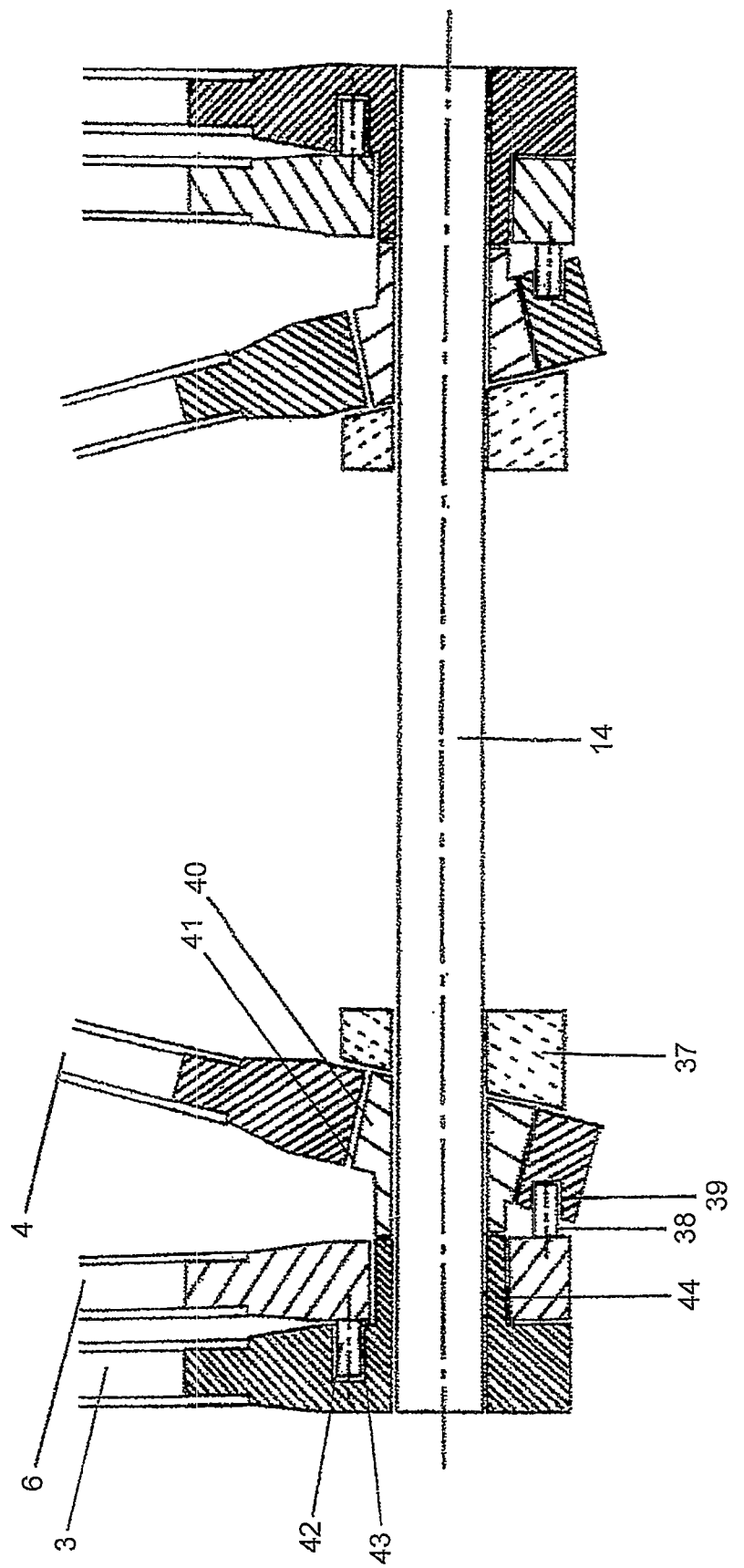
FIG. 2c is a cut-away front view of the hinge mechanism of the pushchair of the present invention.

With reference to FIGS. 2a, 2b and 2c, the pivot mechanism 13 is shown in detail. The pivot mechanism 13 extends across the width of the pushchair 1, and rotatably connects the seat frame 3, rear legs 4 and front legs 6. The pivot mechanism 13 shown in FIG. 2 is in the collapsed state of the pushchair 1.

The pivot mechanism 13 comprises a shaft 14 extending over substantially the whole width of the pushchair 1. The seat frame 3 is rigidly attached to the distal ends of the shaft 14, the seat frame 3 extending perpendicularly to the longitudinal axis of the shaft 14. The front legs 6 are rotatably secured to the shaft 14 adjacent to the distal ends, inside of the seat frame 3. The front legs 6 are rotatable in a plane perpendicular to the axis of the shaft 14.

The rear legs 4 are rotatably attached to the shaft 14 inside of the front legs 6, in close proximity to the points at which the front legs meet the shaft 14. The rear legs 4 rotate in planes which are not perpendicular to the axis of the shaft 14, but are angled relative to the shaft, each rear leg 4 lying in a plane lying at the same angle to the shaft 14. The axis of rotation of the rear legs are configured such that when in their collapsed, retracted, state their wheel-bearing distal ends are close together and when the rear legs are in their deployed state they are spaced relatively far apart.

Each rear leg 4 rotates about a hub 40 secured to the shaft 14. The hub 40 has a cylindrical outer surface 41 about which the rear leg 4 rotates. The cylindrical surface 41 is inclined to the longitudinal axis of the shaft 14, such that the rear leg 4 rotates in a plane inclined to the longitudinal axis of the shaft 14.

Each front leg 6 is attached to the shaft 14 around an extension 44 of the seat frame 3. The extension 44 has an outer surface parallel to the longitudinal axis of the shaft 14, such that the front leg 6 rotates around the shaft 14.

The rear legs 4 are maintained in their axes of rotation by stops 37. The stops 37 are located on the shaft 14, inside of the rear legs 4, and are rigidly secured to the shaft 14. Each stop 37 has an inwardly facing surface in contact with a rear leg 4. The stop surface is angled to the plane of the shaft 14 by an angle equivalent to the angle of the inclined surface 41. Each stop 37 prevents a rear leg 4 from moving inwardly along the shaft, whilst allowing the rear leg 4 to rotate about an inclined axis.

When the pushchair 1 is in a state to carry a child the rear legs 4 are deployed in their outwardly splayed condition. The rear legs 4 and rear wheels 5 have a greater separation than the separation of the front wheels 7, providing good stability of the pushchair 1.

As the pushchair 1 is converted into its collapsed, state, the rear legs 4 are converged together during rotation. The separation of the rear legs 4 and rear wheels 5 in this state is less than the separation of the front legs 6 and front wheels 7. This allows the rear wheels 5 to be located between the front wheels 7 when the pushchair 1 is in its collapsed state, providing for small exterior dimensions of the collapsed pushchair 1.

The pivot mechanism comprises means for limiting the movement of the front legs 6 and rear legs 4 relative to the seat frame 3. The front legs 6 and rear legs 4 are only able to rotate between the angles at which they are located in the deployed state and in the collapsed state. This makes it easier for the user to convert the pushchair 1 between the collapsed state and the deployed state, since the legs 4,6 are stopped at substantially the correct position for use in the deployed or collapsed state.

The limiting of rotation of the rear legs 4 is effected by a first pin 38 extending from each front leg 6, the pin 38 engaging with a curved groove 39 on each rear leg 4. The groove 39 extends in an arc to allow free rotation of the rear leg 4 over a certain range of angles. The ends of the groove 38 substantially corresponds with the angle of rotation of the rear leg 4 relative to the front leg 6 in the deployed state and in the collapsed state.

A second pin 42 extends from each of the front legs 6, from the opposite side of the front leg 6 to the first pin 38. The second pin 42 engages with a curved groove 43 on the seat frame 3. The groove 43 extends in an arc to allow free rotation of the front leg 6 over a certain range of angles. The ends of the groove 43 substantially corresponds with the angle of rotation of the front leg 6 relative to the seat frame 3 in the deployed state and in the collapsed state.

Figure 3:
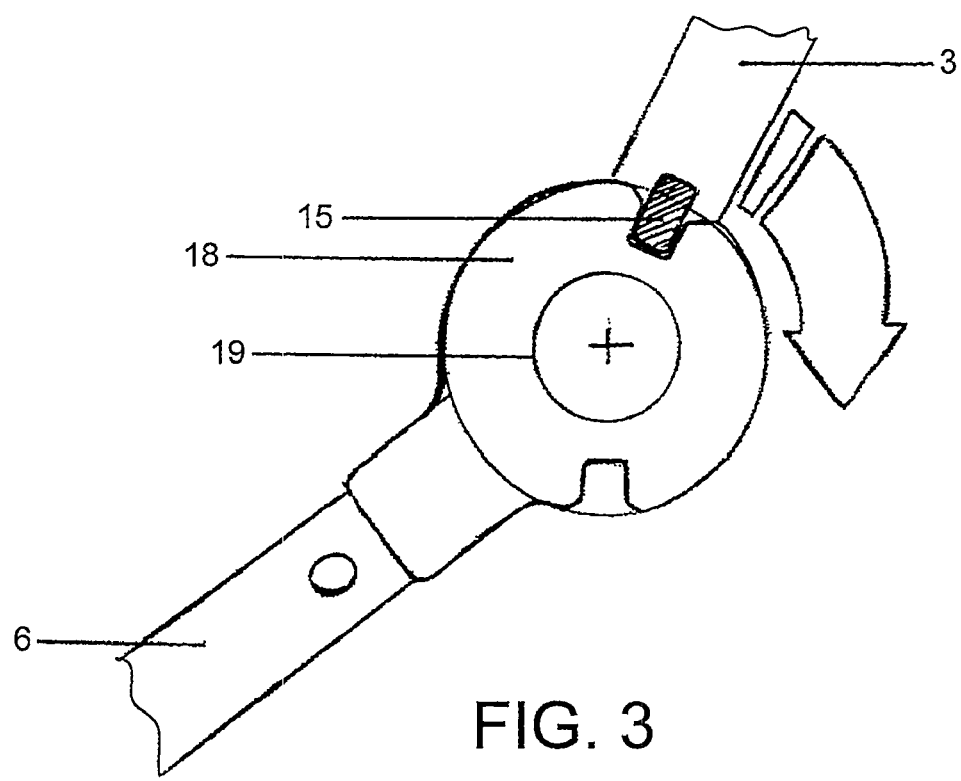
FIG. 3 is a side elevation of the hinge mechanism of the pushchair of the present invention.

FIG. 3 shows the mechanism by which the front legs 6 and rear legs 4 are joined to the shaft 14 and locked in either a first, pushchair, state or a second, collapsed, state. Each front leg 6 is provided with an annular portion 18 at its proximal end. The annular portion 18 defines a circular bore 19, having a slightly larger diameter then the shaft 14. The bore 19 receives shaft 14, such that the annular portion 18 can freely rotate about the shaft 14. The annular portion 18 is provided with two notches 17. The notches are of a slightly larger width than a locking bar 15.

The locking bar 15 is connected to the seat frame 3, and is slidable relative to the seat frame 3. A spring 16 urges the locking bar 15 toward the front leg annular portion 18. When the locking bar 15 coincides with a notch 17, the locking bar 15 is urged into the slot. Once the locking bar 15 is in a notch 17, it is not possible for the front leg 6 to rotate relative to the seat frame. The two notches 17 correspond to the two relative angles between the seat frame 3 and the front legs 6 in the deployed (pushchair) state and in the collapsed state. One notch 17 is positioned so that in the first state the front leg extends downwardly and forwardly of the pivot mechanism 13, and the other notch 17 is positioned so that in the second state the front leg extends parallel and in the plane of the seat frame 3.

Each rear leg 4 has a corresponding annular portion (not shown), having notches which are engageable by the locking bar 15. The notches are positioned such that the rear legs 4 can be locked in place in the first state to extend downwardly and rearwardly of the pivot mechanism 13, and in the second state, the rear legs 4 extend substantially in the plane of the seat frame 3.

The locking bar 15 and notches of the front and rear legs 6,4 are chamfered to an equivalent degree. This improves the ease of engagement of the locking bar 15 into the notches 17.

In the deployed state and the collapsed state, it is the locking bar 15 which fastens the legs 4,6 in position, and not the pins 38. Although the pins 38 and grooves 39 limit movement of the legs 4,6 to approximately the deployed and collapsed positions of the legs 4,6, the grooves 39 extend over a slightly larger range of angles than defined by the notches 17. This means that the stress on the pivot mechanism 13, particularly when in use in the deployed state, is resisted by the locking bar 15 and not the pins 38.

Figure 4:
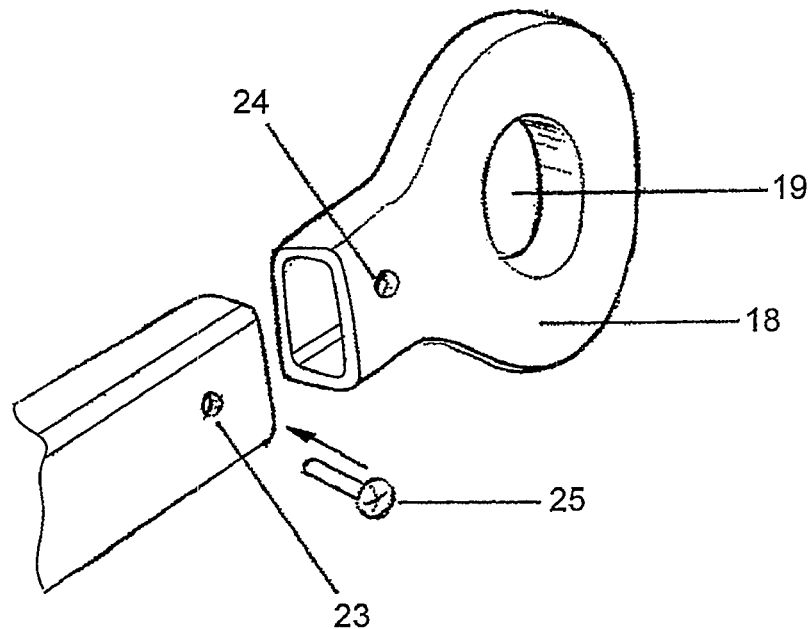
FIG. 4 is perspective view of part of the hinge mechanism of the pushchair of the present invention.

FIG. 4 shows how the annular portion 18 is secured to the proximal end of a front leg 6. The legs 6 have a hole 23 which coincides with a hole 24 in the annular portion 19. A pin or screw 25 is fastened in the holes 24,25 to securely attach each annular portion 19 to the legs 6.

Figure 5:
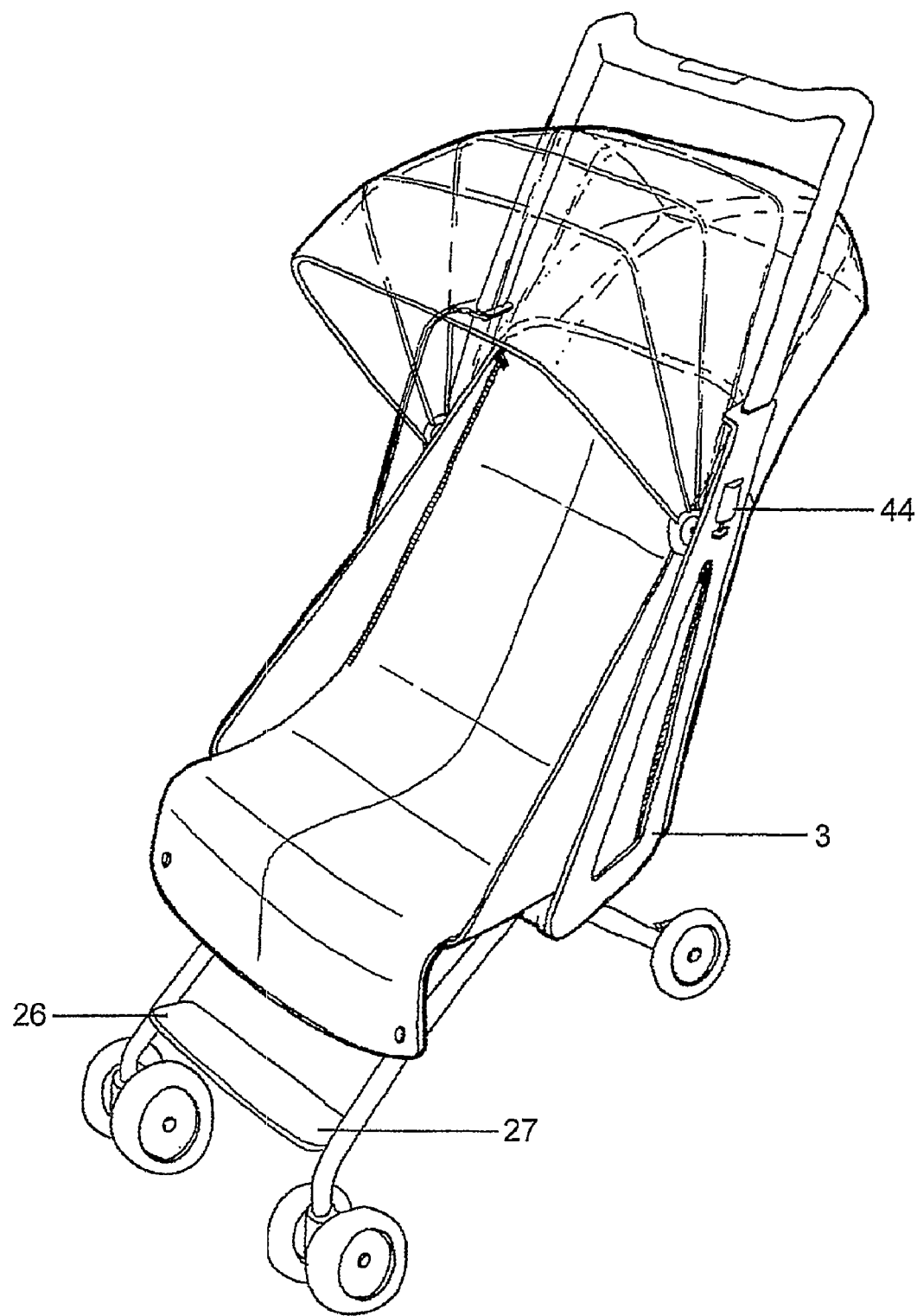
FIG. 5 is a perspective view of a second embodiment of the pushchair of the present invention.

With reference to FIG. 5, the locking bar 15 is connected to a slider 44 on the seat frame 3. A user can raise the locking bar 15 by pulling upwardly on the slider 44, disengaging the locking bar 15 from the notches 17.

The pushchair 1 has a footrest 26. A child may put their feet on the footrest when sitting in the seat 2, in order to assist them to sit comfortably and securely. The footrest 26 is rotatable between the first and second states of the pushchair 1. In the first state of the pushchair 1 shown, the footrest 26 has its upper surface 27 facing substantially upwardly for receiving the feet of the child.

Figure 6:
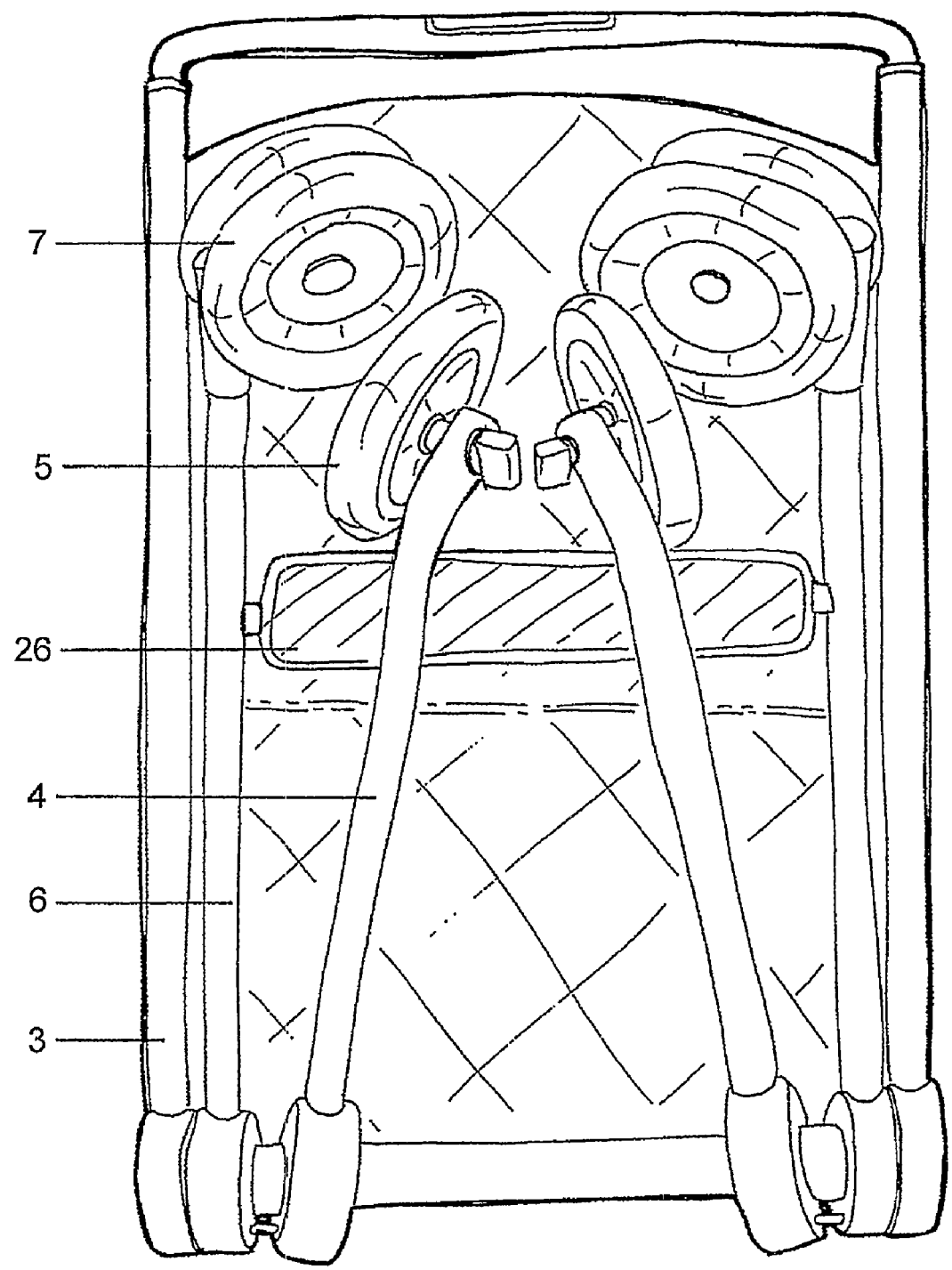
FIG. 6 is a frontal view of the pushchair of the present invention in its collapsed portable state.

With reference to FIG. 6, the pushchair 1 is shown in its collapsed state. The rear legs 4, front legs 6 have been rotated into substantially the plane of the seat frame 3. The rear legs 4 converge due to their axes of rotation about the shaft 14, and allow the rear wheels 5 to be located substantially between the front wheels 7. The positioning of the front wheels 7 between the rear wheels 5 means that the pushchair 1 has very small exterior dimensions in this state.

In the second, collapsed, state of the pushchair 1, the footrest rotates so that the upper surface 27 is in the same plane as the rear legs 4. The upper surface 27 of the footrest is flush against the rear legs 6, so that the pushchair 1 can assume the smallest overall dimensions possible. FIG. 6 shows the handle 8 retracted into the seat frame 3.

Figure 7A:
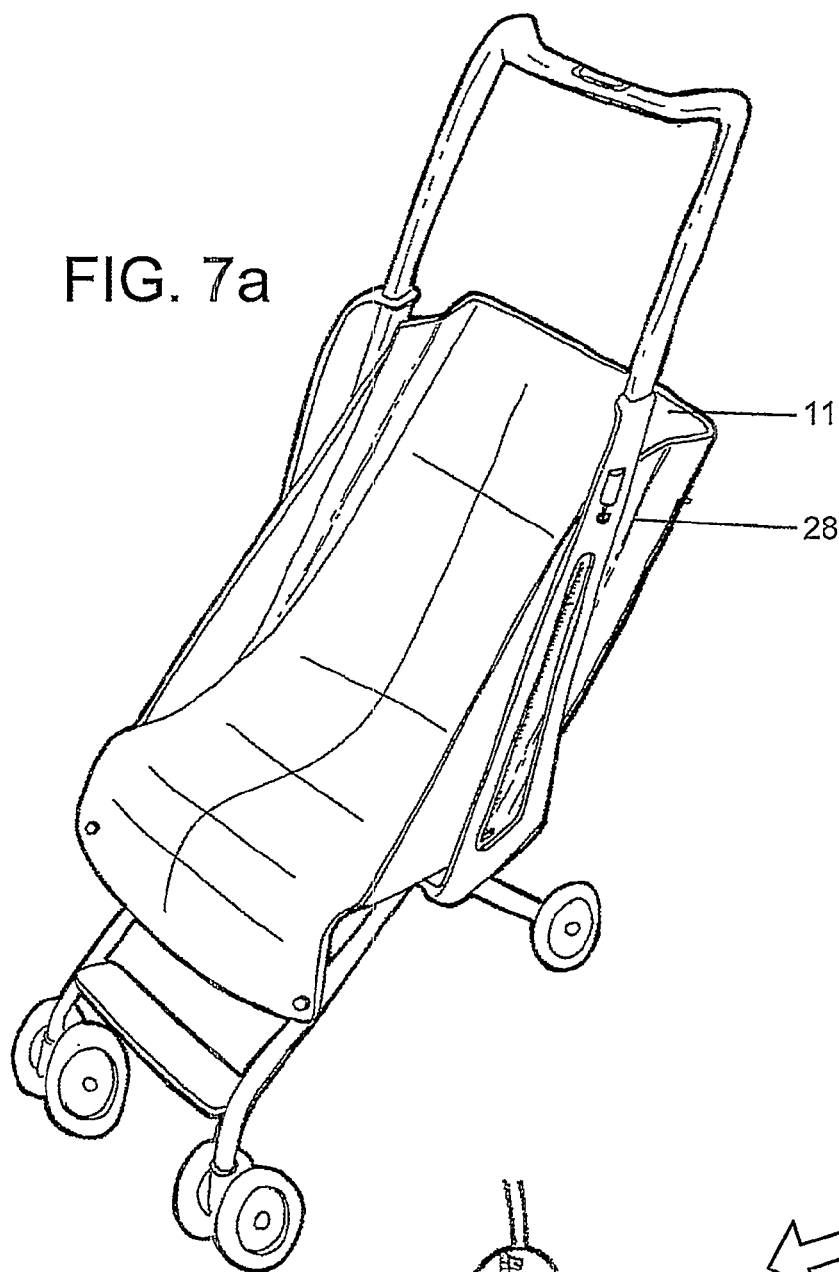
FIG. 7a is a perspective view of a first reclining embodiment of the pushchair of the present invention.
Figure 7B:
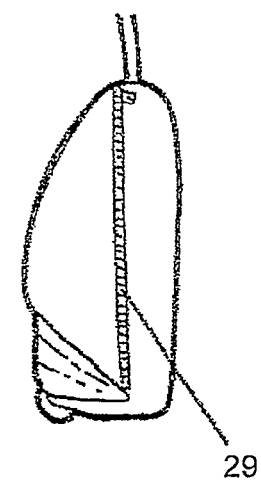
Figure 7C:
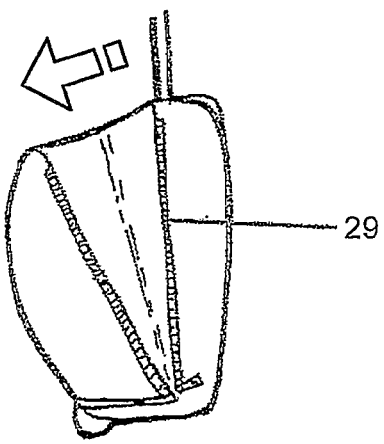
Figure 8A:
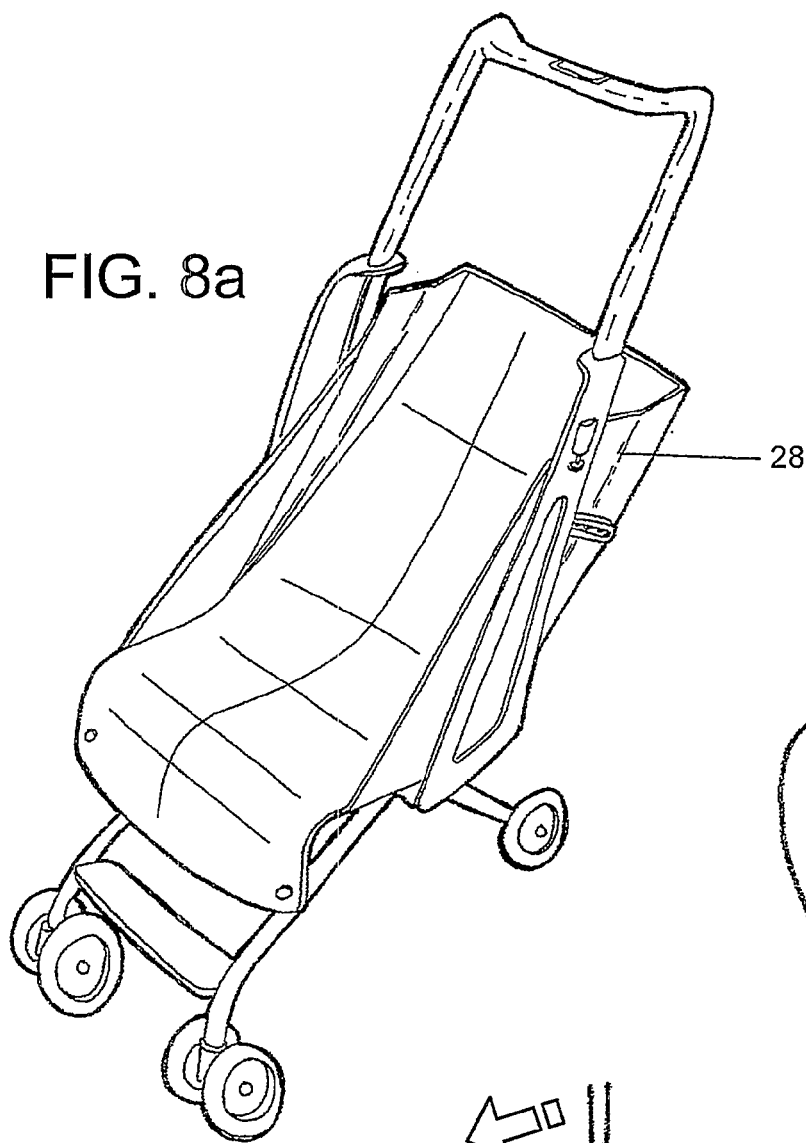
FIG. 8a is a perspective view of a second reclining embodiment of the pushchair of the present invention.
Figure 8D:
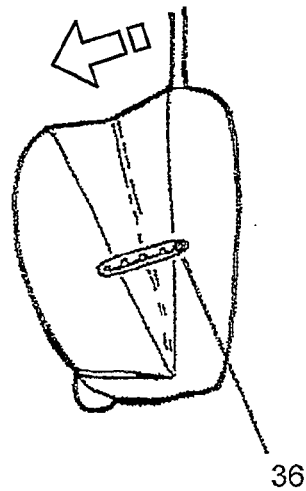
Figure 8C:
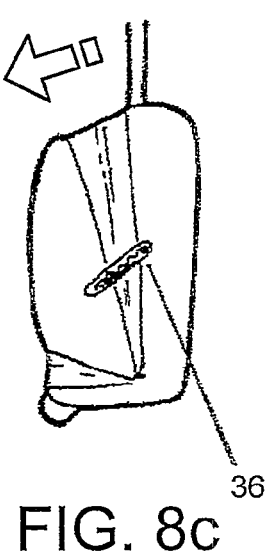
Figure 8B:
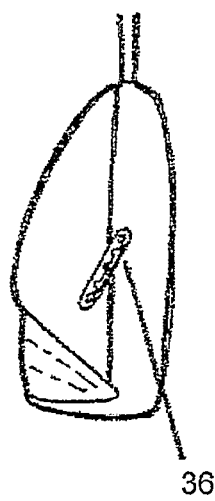

With reference to FIGS. 7a to 7c, the seat 2 is provided with means to allow the seat to be reclined. This is of particular importance for the comfort of younger children, who may require a reclined seat. The seat back 11 is connected to the seat frame 3 by a concertina portion 28. The concertina portion 28 comprises a triangular-shaped flexible, material. The concertina portion 28 allows movement between the seat back 11 and seat base 12, so that the seat back 11 can recline.

The seat back 11 is held in its more upright position by a zip 29 along each side of the seat 2. The zip 29 joins the two sides of the concertina portion together, and so maintains the concertina portion 19 in its folded state. When the zips 29 are unfastened, the concertina portion 28 expands by unfolding, the seat back 11 reclines at an angle to the seat frame 3.

Figure 9:
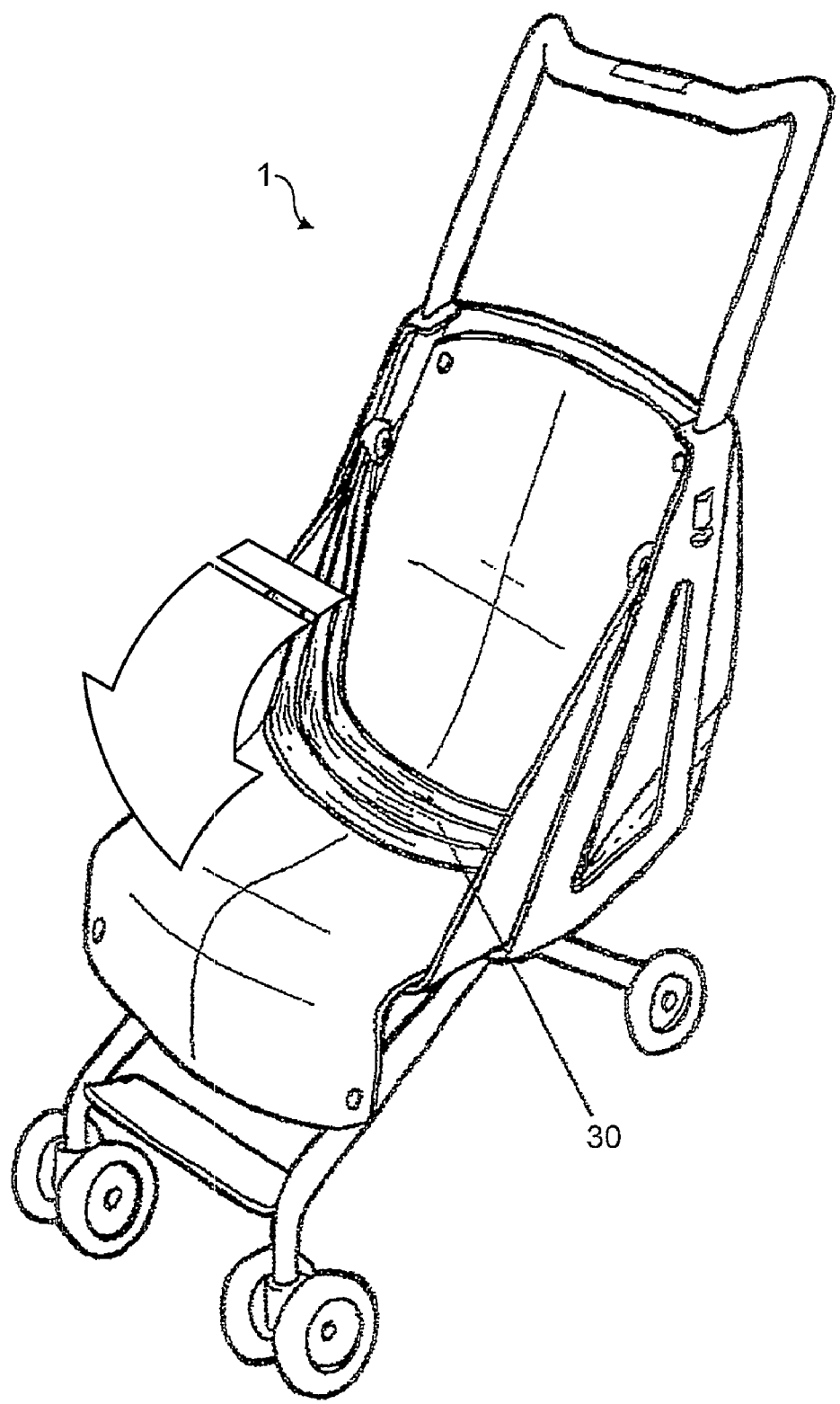
FIG. 9 is a perspective view of a first canopy embodiment of the pushchair of the present invention.
Figure 10:
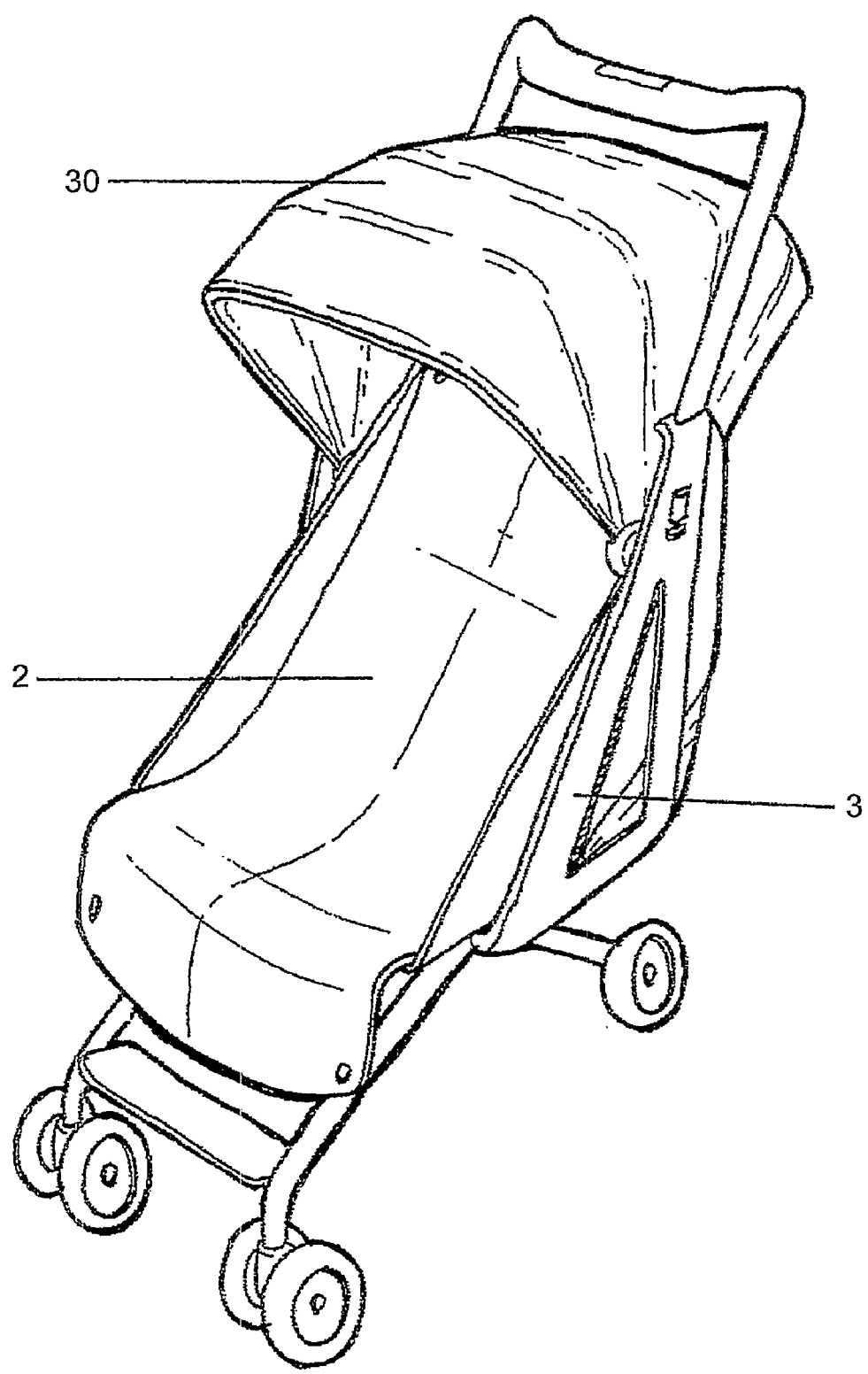
FIG. 10 is a perspective view of the first canopy embodiment of the pushchair of the present invention.

With reference to FIGS. 9 and 10, the pushchair 1 may comprise a canopy 30, which may act as a cover over a child to protect the child from light rain or bright sunlight. The canopy 30 may be rotatably attached to the inside of the seat frame 3. The canopy 30 comprises folds so that it is expandable to provide a large area in use, and folds to a small size when stored. FIG. 9 shows the canopy 30 stored out of use on the seat base 12. The canopy 30 can be rotated to a position above the seat 2 for use, as shown in FIG. 10.

Figure 14:
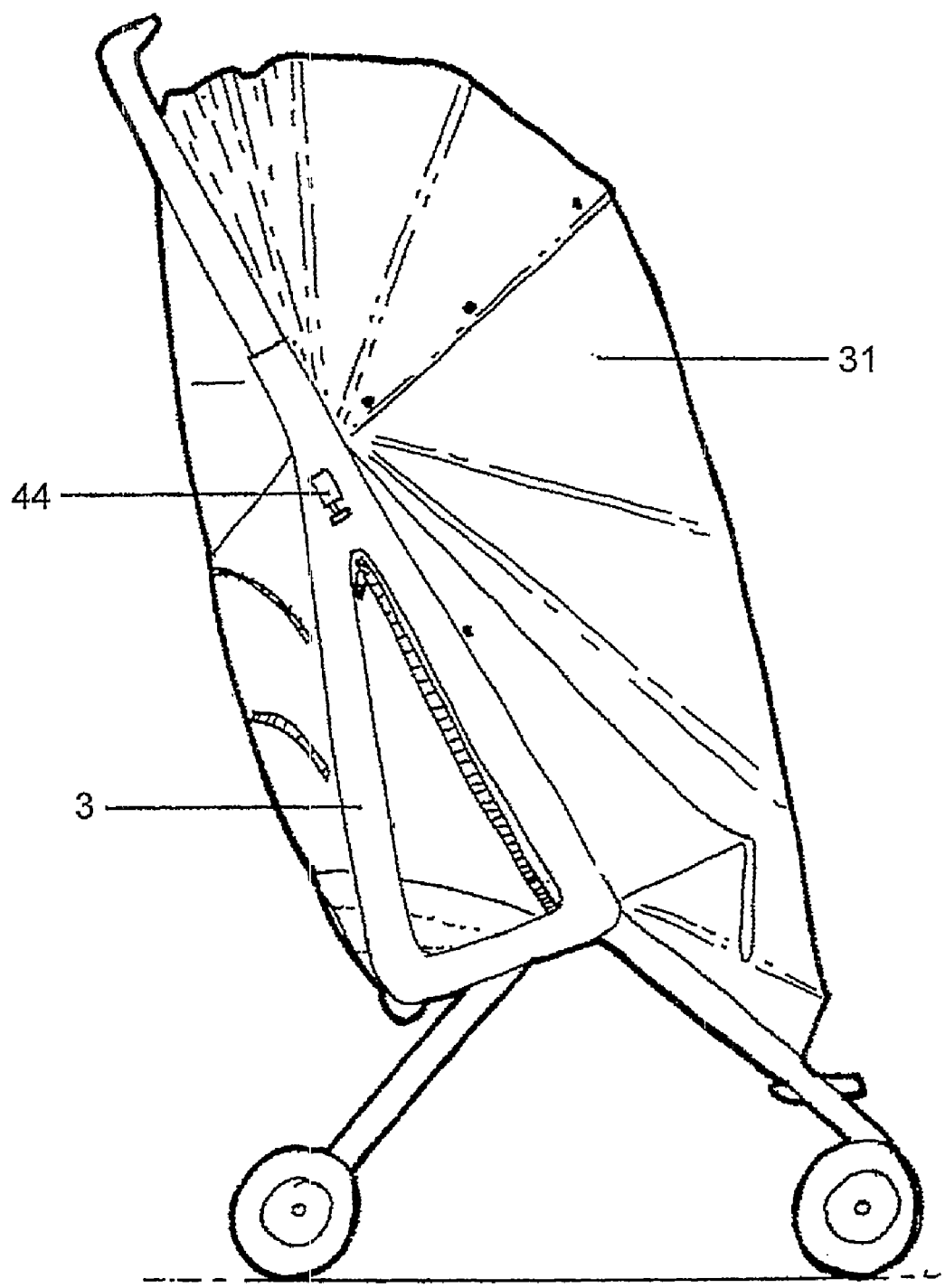
FIG. 14 is a side view of the third canopy embodiment of the pushchair of FIG. 13 with the canopy deployed as a rain cover.

With reference to FIG. 14, the pushchair 1 may comprise a rain cover 31. The rain cover 31 completely encloses the seat 2 to provide complete protection for the child from rain or other adverse weather conditions.

Figure 15:
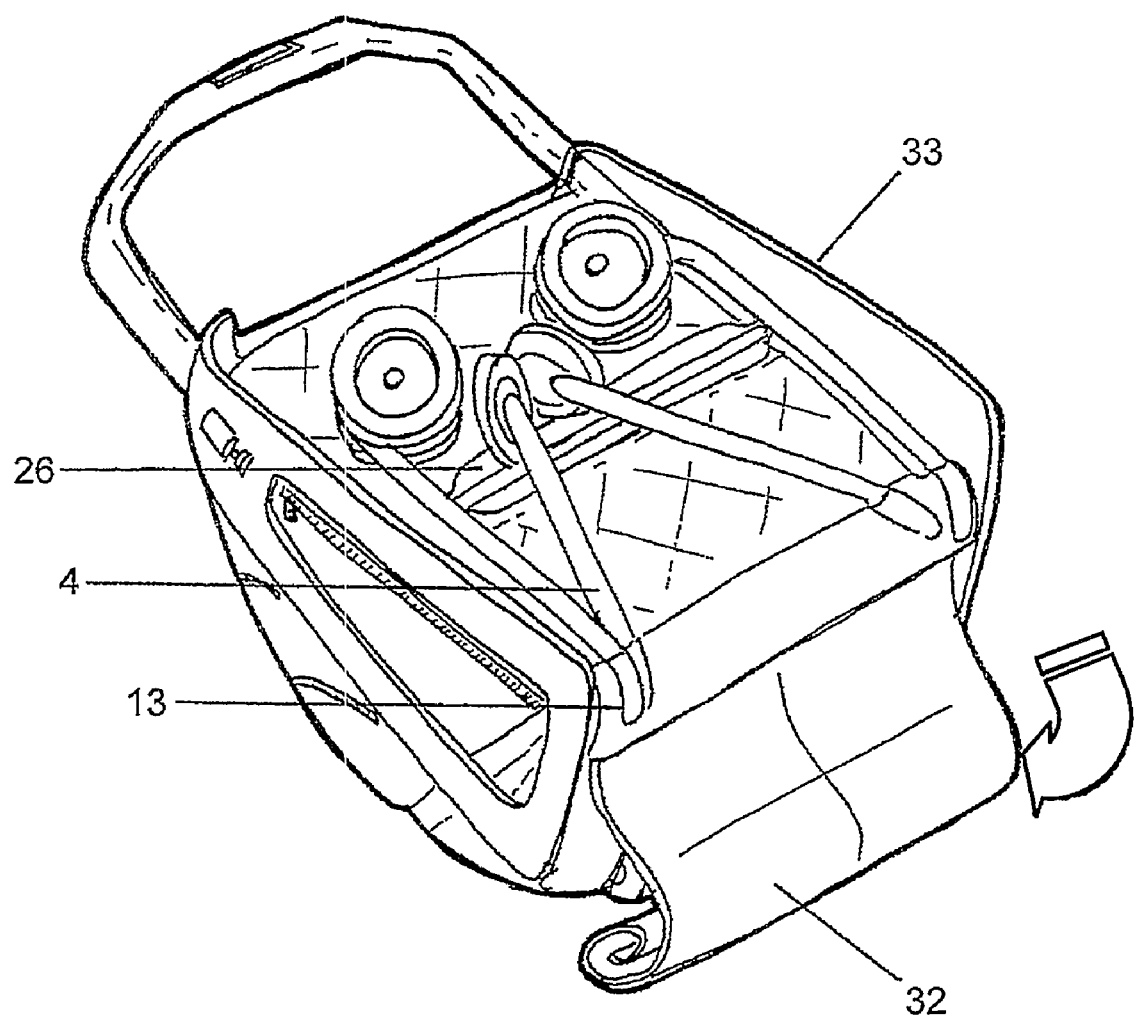
FIG. 15 is a perspective view showing a pushchair of any one of the previously illustrated embodiment in its collapsed state.

With reference to FIG. 15, the pushchair may comprise a flap 32. The flap 32 is made of a flexible material, which can be rolled up and so stored out of the way of the legs 4, 6 in the first state. The flap 32 is secured in position by means of a hook-and-loop fastener and/or a zip.

When the pushchair 1 is in its collapsed state, the flap 32 is moveable to cover the front legs 6 and rear legs 4. This protects the front legs 6 and rear legs 4, and hides the legs 4, 6 from view so that the pushchair 1 resembles a piece of luggage in its collapsed state.

The pushchair 1 may include a carrying strap 33. The carrying strap 33 is connected at two points to the seat frame 3, to allow the pushchair 1 to be carried in its collapsed state on the shoulder of a user.

The pushchair may comprise additional wheels, which extend from the pushchair 1 in its collapsed state. This allows the pushchair 1 in its collapsed state to be wheeled along as a piece of luggage.

Figure 16:
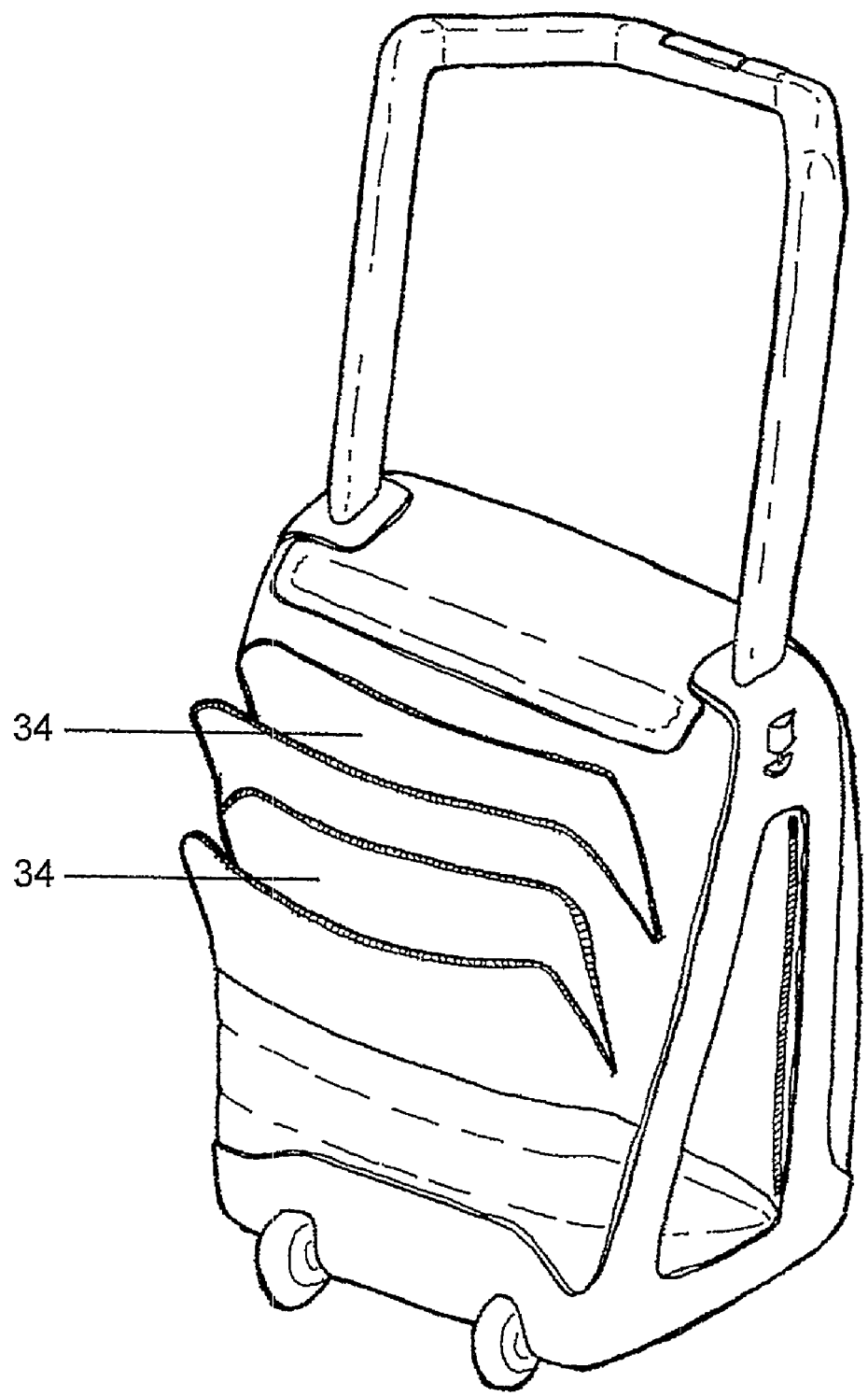
FIG. 16 is a alternative view of the FIG. 15 pushchair in its collapsed state.

With reference to FIG. 16, the pushchair 1 has one or more storage compartments 34 for the storage of items. The storage compartments 34 are closed by a zip or any other suitable means. The storage compartments 34 may be accessible in both the first and second states of the pushchair 1.

The pushchair 1 in its collapsed state is smaller than typical airline size requirements for hand luggage. Typical dimensions for hand luggage are 55 cm×40 cm×20 cm. The collapsed pushchair 1 is preferably sufficiently smaller than these dimensions to permit items to be stored in the storage compartments 34 and still remain within the permitted dimensions.

The front wheels 7 are preferably castored to the front legs 6, to allow swiveling of the front wheels 7 and hence steering of the pushchair. The front wheels 7 may be positioned in the collapsed state at 90 degrees to their normal position pointing forwards in the deployed state. This allows the front wheels 7 to be more efficiently and compactly stored.

The annular portions of the legs 4,6 and seat frame 3 may be made of polyester material, or any material which is durable and has relatively low frictional properties. The legs 4,6 and seat frame 3 may be made of extruded aluminum, or any other suitable material. The seat may be made of nylon or any other suitable material. The seat may also comprise foam to improve the comfort of the seat.

Figures 17A, 17B, 17C:
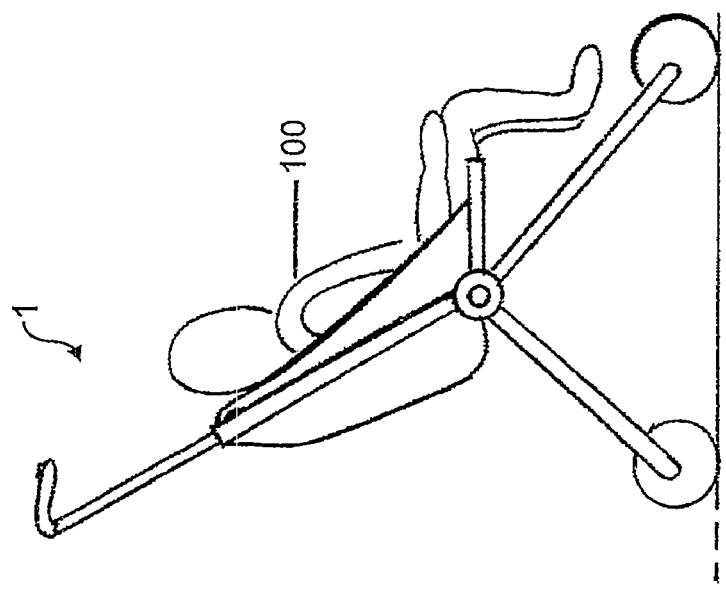
FIGS. 17a to 17g show schematically a pushchair of any of the previously illustrated embodiment in various positions between a deployed state and a collapsed portable state.
Figure 17G:
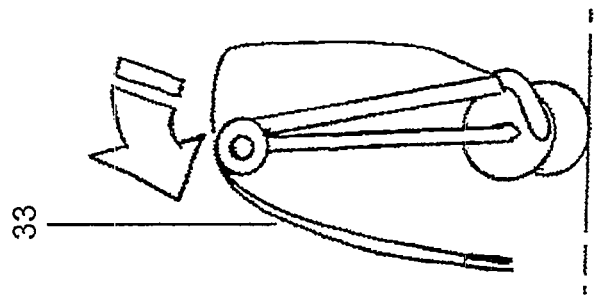

With reference to FIGS. 17a-17g, a method of collapsing the pushchair 1 is shown. FIG. 17a shows the pushchair 1 in use as a pushchair carrying an infant 100. As shown in FIG. 17b, the infant 100 is first removed from the seat 2. The handle 8 is then slide downwardly into the seat frame 3. The seat base 12 is folded upwardly such that it is pressed flat against the seat back 11. The seat base 12 may be secured against the seat back by means of a hook and loop fastener or zip.

Figure 17F:
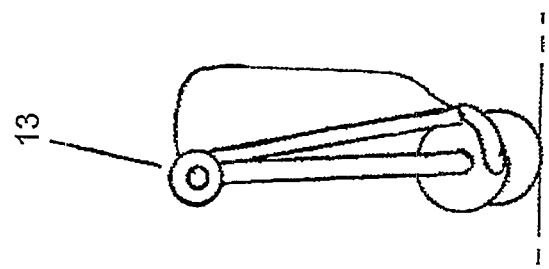
Figure 17E:
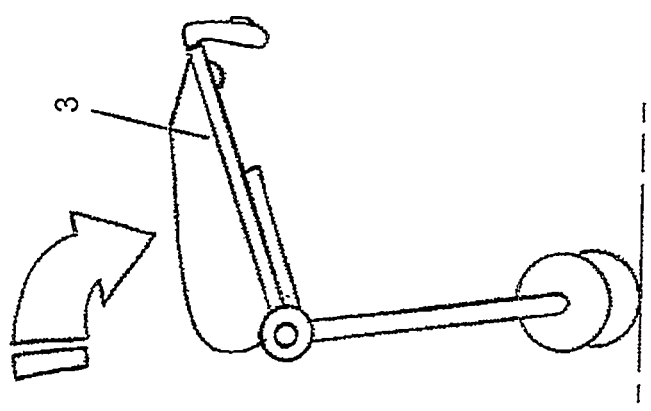
Figure 17D:
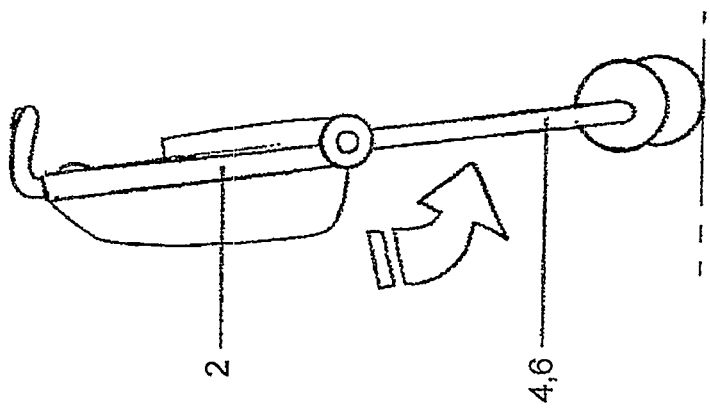

As shown in FIGS. 17c and 17d, the locking bar 15 is removed from the notch 17, allowing the front legs 6 and rear legs 4 to rotate relative to the seat frame 3. The rear legs 4 are rotated forwardly, and the front legs 6 are rotated rearwardly relative to the seat 2 until the rear legs 4 and front legs 6 are aligned. FIG. 17e shows that the seat frame 3 is then rotated relative to the rear legs 4 and front legs 6. Once the seat frame 3 is as close to the front and rear legs 4,6 as possible, the pivot mechanism 13 locks the legs 4,6 and the seat frame 3 together. As shown in FIG. 17f, the pushchair 1 is then in its collapsed state, and can be easily carried or wheeled.

The seat 2 is described above as being able to recline. As an alternative to the expandable concertina portion being secured by a zip, it is also possible for the concertina portion to be secured by a ratchet mechanism 36 as shown in FIGS. 8a to 8d. The ratchet mechanism 36 is attached on either side of the seat 2, to releasably hold the concertina portion 29 together to prevent it from expanding. The ratchet mechanism 36 can lock at a number of different points, to allow a plurality of different angles of reclination.

Figure 11:
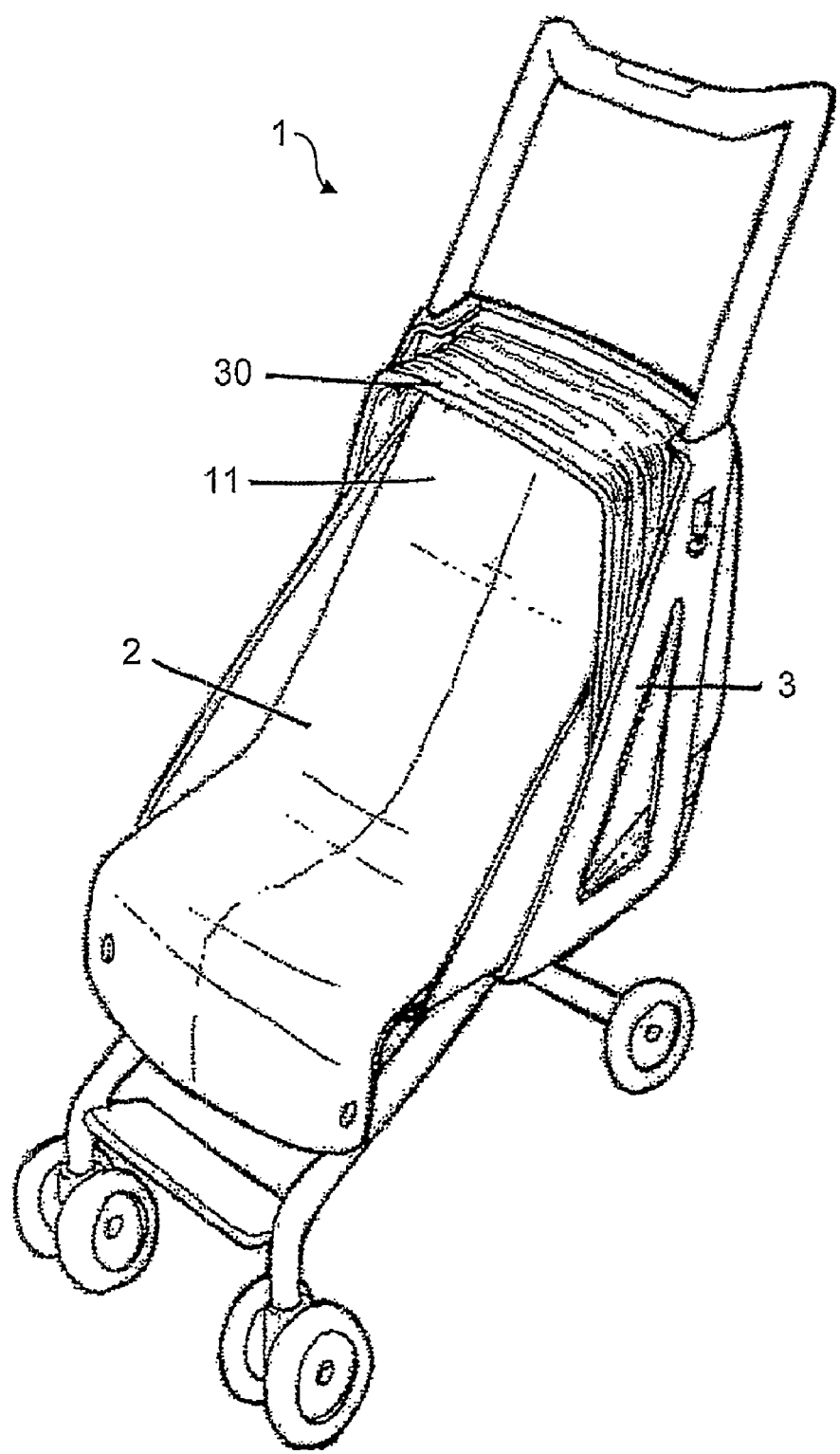
FIG. 11 is a perspective view of a second canopy embodiment of the pushchair of the present invention.
Figure 12:
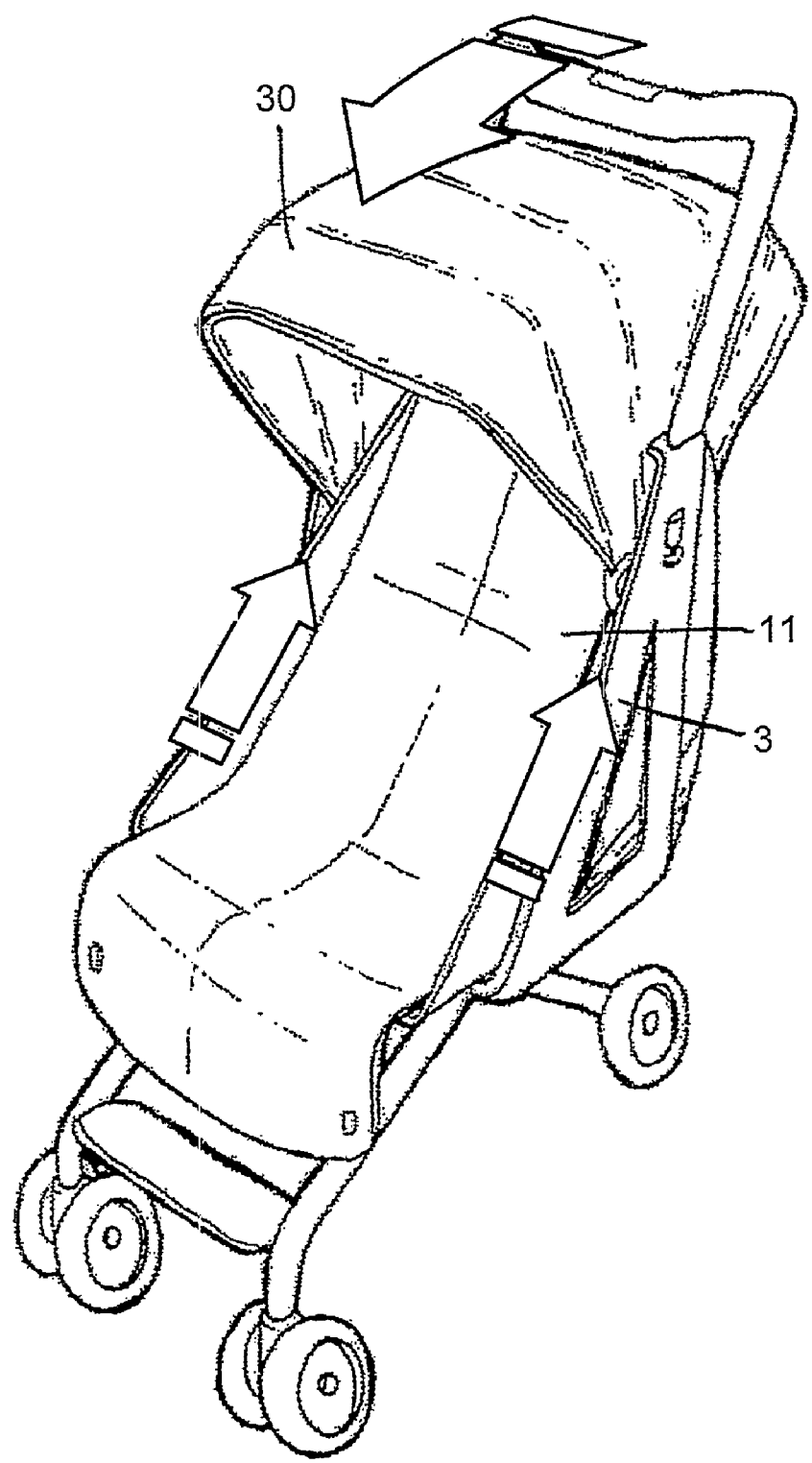
FIG. 12 is a perspective view of the second canopy embodiment of the pushchair of FIG. 11.
Figure 13:
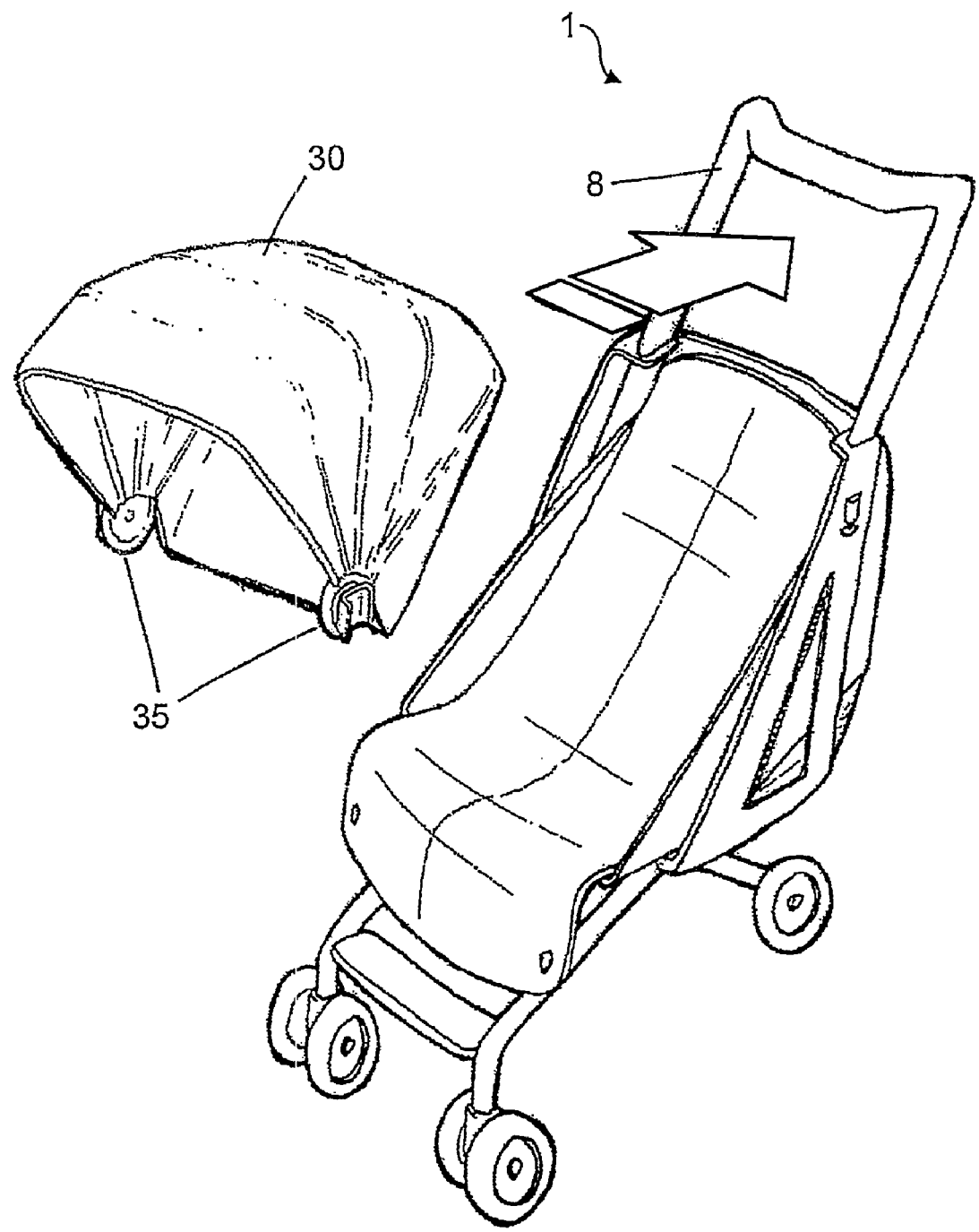
FIG. 13 is a perspective view of a third canopy embodiment of the pushchair of the present invention.

The canopy 30 is described above as rotatably attached to the seat frame 3. Alternatively, as shown in FIGS. 11 and 12, the canopy can be slidably attached to the seat frame 3. In the stored position, the canopy is folded adjacent to the top of the seat back 11. When required for use, the canopy is slid upwardly along the seat frame, and unfolded so as to cover the seat 2. Alternatively, as shown in FIG. 13, the canopy could be completely detachable from the pushchair 1. In this embodiment, the canopy has clips 35, the clips 35 facing outwardly to allow the canopy to be clipped to the handle 8.

Although the pushchair 1 is shown having two front legs and two rear legs, other arrangements are possible. For example, there may be only one front leg, located centrally on the shaft 14. Alternatively, there could be only a single rear leg.

The cams 37 for ensuring that the rear legs 4 rotate in the correct plane may be configured differently than described above. The cams may be located adjacent the outer side of the rear legs 4, i.e. between the front legs 6 and rear legs 4, and secured to the shaft. The cams could alternatively be attached to the front legs 4, and not rigidly attached to the shaft 14.

The front wheels 7 may protrude from the pushchair in the collapsed state and so still be operable. This would allow the pushchair 1 in its collapsed state to be wheeled along as a piece of luggage.

Figure 18:
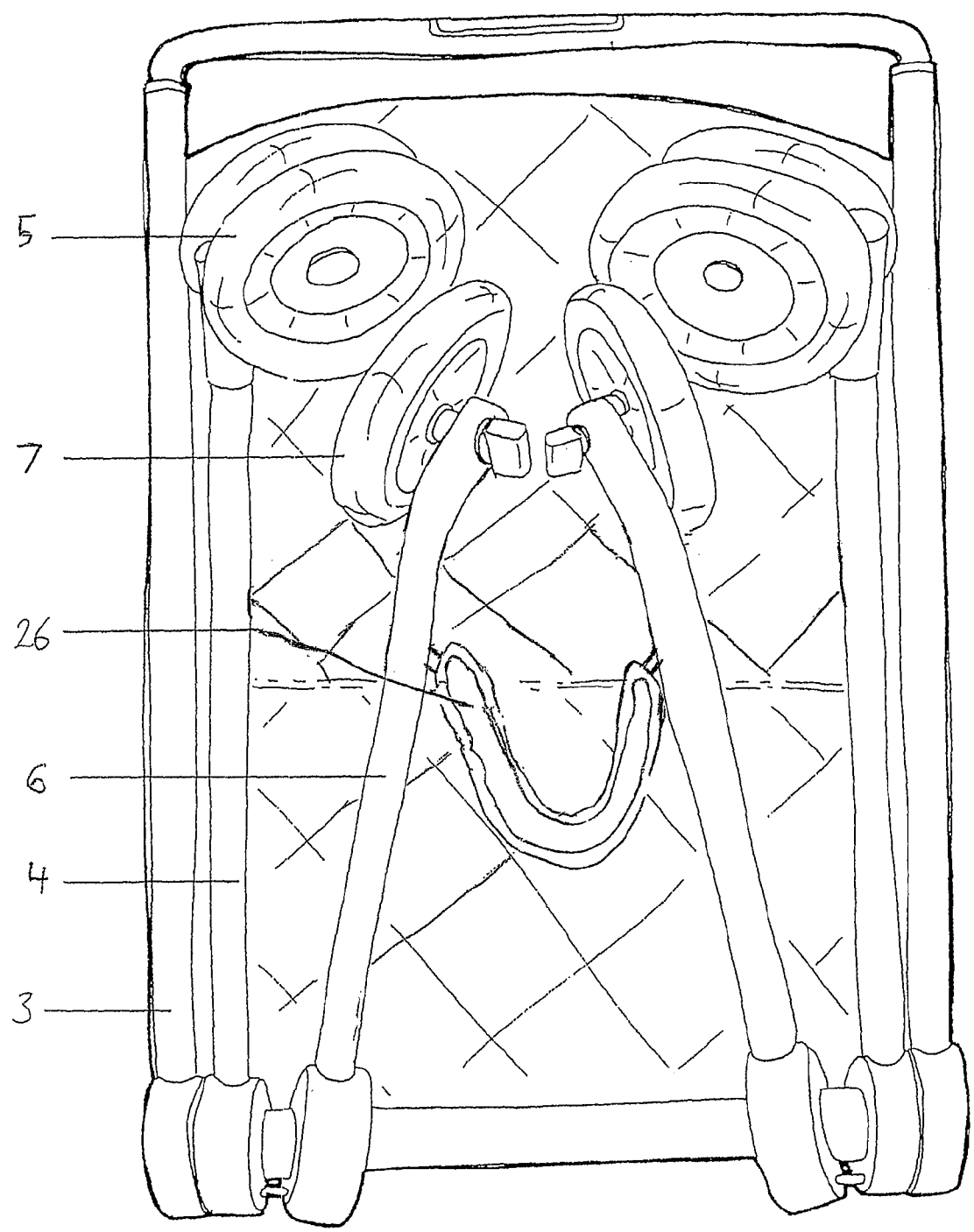
FIG. 18 is a frontal view of the pushchair of the present invention in its collapsed portable state, wherein the front legs rotate on two unparallel plans.

The front legs 6 and rear legs 4 have been described as rotating about the same shaft 14, and having different axes of rotation. Alternatively, the rear legs 4 could rotate parallel to the seat frame 3 and, the front legs could have axes of rotation at an angle to the shaft 14, so that they are splayed outwardly in the first state and converge together in the second, collapsed state, as seen in FIG. 18. In an alternative embodiment, the front legs 6 and rear legs 4 may not be mounted on the same shaft 14, but may be mounted on separate shafts or by any other means allowing rotation. The front legs 6 and rear legs 4 do not need to be mounted on the pushchair 1 adjacent to each other, but could be offset in any direction within a close proximity of each other.

The offset planes of rotation of the rear legs 4 could be effected by mounting the legs 4 on a shaft 14 which is not straight. The rear legs 4 would be mounted on a part of the shaft angled to a part of the shaft on which the front legs 6 are mounted.

The rotation of the legs 4,6 has been described as limited by means of a particular arrangement of pins and grooves. The limiting of rotation could also be effected by the reverse arrangement of pins and grooves, i.e. a pin located on a rear leg engaging with a groove on the front leg. The pin may be of any cross-sectional shape suitable for sliding in a groove. Any other means for limiting the rotation of the legs relative to the frame could alternatively be utilised.

The pushing bar 20 may be in the form of a straight bar, or may also extend forwardly as bull-bars. The carrying strap 33 may be connectable across the length of the pushchair 1 or across the width of the pushchair 1. The pushchair 1 may be provided with three buckles, a first buckle located at a corner, a second buckle spaced by the length of the pushchair from the first buckle, and a third buckle spaced by the width of the pushchair from the first buckle. By selection of which two buckles the strap 33 is connected between, the carrying position of the pushchair 1 in its collapsed state can be varied.

The invention claimed is:

1. A collapsible pushchair comprising:
    a seat frame;
    at least one front leg;
    first and second rear legs;
    wherein:
    the pushchair has a first deployed state, and a second stored state in which the pushchair is collapsed into a size smaller than in the first deployed state,
    the entire at least one front leg and the entire first and second rear legs are directly rotatably mounted on a common shaft forming part of the seat frame, such that the entire at least one front leg and the entire first and second rear legs are all rotatable about the shaft in respective circular arcs centred on the shaft;
    the first and second rear legs have respectively first and second axes of rotation; and
    the first axis of rotation is not parallel to the second axis of rotation, such that distal ends of the rear legs spaced from the ends of the rear legs mounted on the seat frame are distanced from each other by a larger distance when in the first deployed state than when in the second stored state.

2. A collapsible pushchair according to claim 1 wherein the at least one front leg has a third axis of rotation, wherein the first and second axes of rotation are not parallel to the third axis of rotation.

3. A collapsible pushchair according to claim 1 wherein the shaft is a straight rod.

4. A collapsible pushchair according to claim 1 wherein the at least one front leg and rear legs all rotate in the same sense from the first deployed state to the second stored state.

5. A collapsible pushchair according to claim 1 further comprising locking means for releasably locking the front leg and the rear legs in their first deployed state and in their second stored state; wherein the locking means comprises:
    a first notch provided on each leg corresponding to the position of that leg in the first deployed state;
    a second notch provided on each leg corresponding to the state of that leg in the second stored state; and
    a bar common to all the legs moveable into engagement with the first notch and the second notch to lock the legs in their first deployed state or in their second stored state.

6. A collapsible pushchair according to claim 5 wherein the at least one front leg and the rear legs each comprise a curved portion on which the first notch and the second notch are formed, the bar slidable over the curved portion when not engaged in the first notch or the second notch.

7. A collapsible pushchair according to claim 1 wherein there are two front legs.

8. A collapsible pushchair according to claim 1 wherein the two front legs are both rotatable about a third axis of rotation, and the first and second rear legs are rotatable about the first and second axes of rotation which are inclined at an angle to the third axis of rotation such that:
    in the first deployed state the separation of ends of the rear legs distal from the shaft is larger than the separation of ends of the front legs distal from the shaft; and in the second stored state the separation of the distal ends of the rear legs is smaller than the separation of the distal ends of the front legs.

9. A collapsible pushchair according to claim 1 wherein the seat frame and at least one leg include rotation limiting means for limiting rotation of the at least one leg relative to the seat frame, wherein said rotation limiting means includes a protrusion movable in a groove, said groove defining a stop at each end of said groove, wherein engagement of said protrusion against said stop prevents further rotation of the at least one leg relative to the seat frame.

10. A collapsible pushchair comprising:
    a seat frame;
    at least one rear leg;
    first and second front legs;
    wherein:
    the entire at least one rear leg and the entire first and second front legs are directly rotatably mounted on a common shaft forming part of the seat frame, such that the entire at least one rear leg and the entire first and second front legs are all rotatable about the shaft in respective circular arcs centred on the shaft;

the pushchair has a first deployed state, and a second stored state in which the chair is collapsed into a size smaller than in the first deployed state; and the first and second front legs have respectively a first and second axes of rotation, wherein the first axis of rotation is not parallel to the second axis of rotation, such that distal ends of the front legs spaced from the ends of the front legs mounted on the seat frame are distanced from each other by a larger distance when in the first deployed state than when in the second stored state.

11. A collapsible pushchair according to claim 10 wherein the at least one rear leg has a third axis of rotation, wherein the first and second axes of rotation are not parallel to the third axis of rotation.

12. A collapsible pushchair according to claim 11 further comprising a handle, the handle being telescopically mounted in the seat frame.

13. A collapsible pushchair according to claim 1 comprising storage compartments accessible when the pushchair is in the first deployed state and in the second stored state.

14. A collapsible pushchair comprising:
a seat frame;
at least one front leg rotatably mounted on the seat frame;
first and second rear legs rotatably mounted on the seat frame;
wherein
the entire at least one front leg and the entire first and second rear legs are directly rotatably mounted on a common shaft forming part of the seat frame, such that the entire at least one front leg and the entire first and second rear legs are all rotatable about the shaft in respective circular arcs centred on the shaft; and the pushchair has a first deployed state for seating a person, and a second stored state in which the pushchair is collapsed into a size smaller than in the first deployed state.

15. The collapsible pushchair according to claim 14 has dimensions in the second stored state equal to or smaller than 55 cm×40 cm×20 cm.

16. A collapsible pushchair comprising:
a seat frame;
at least one front leg;
first and second rear legs;
wherein
the entire at least one front leg and the entire first and second rear legs are directly rotatably mounted on a common shaft forming part of the seat frame, such that the entire at least one front leg and the entire first and second rear legs are all rotatable about the shaft in respective circular arcs centred on the shaft;

the pushchair has a first deployed state, and a second stored state in which the chair is collapsed into a size smaller than in the first deployed state;

the first and second rear legs have respectively a first and second axes of rotation, wherein the first axis of rotation is not parallel to the second axis of rotation, such that distal ends of the rear legs spaced from the ends of the legs mounted on the seat frame are distanced from each other by a larger distance when in the first deployed state than when in the second stored state; and the at least one front leg and rear legs all rotate in the same sense from the first deployed state to the second stored state.

17. A collapsible pushchair according to claim 16 having a seat back moveably secured to the seat frame, such that the seat back can be reclined.

18. A collapsible pushchair according to claim 17 comprising a seat back and a seat base supported by the seat frame, wherein the seat back has an expandable portion which allows the seat back to be reclined.

19. A collapsible pushchair according to claim 18 wherein the expandable portion is restricted from expanding by a zip or by a ratchet system.

* * * * *